UNITED STATES PATENT OFFICE.

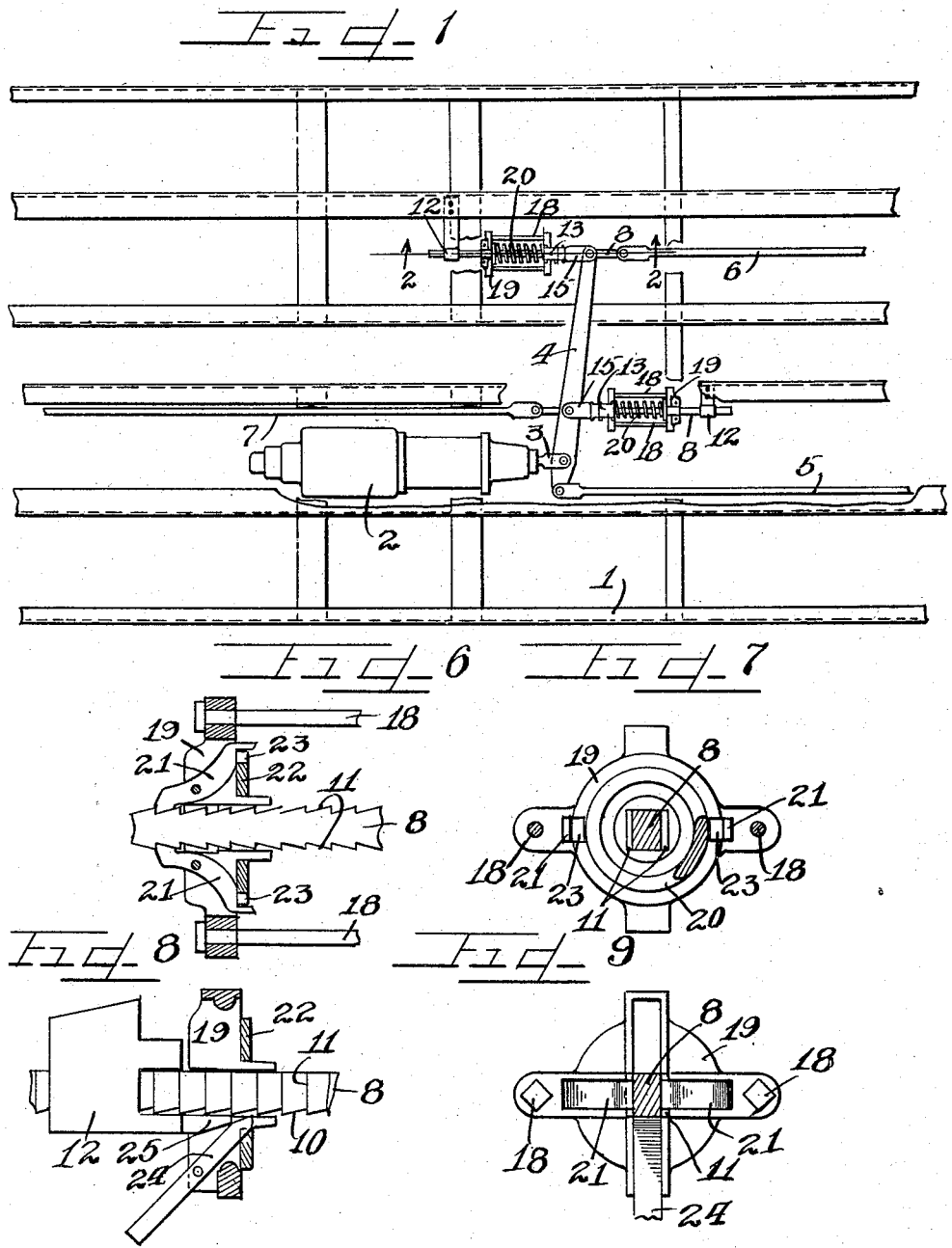

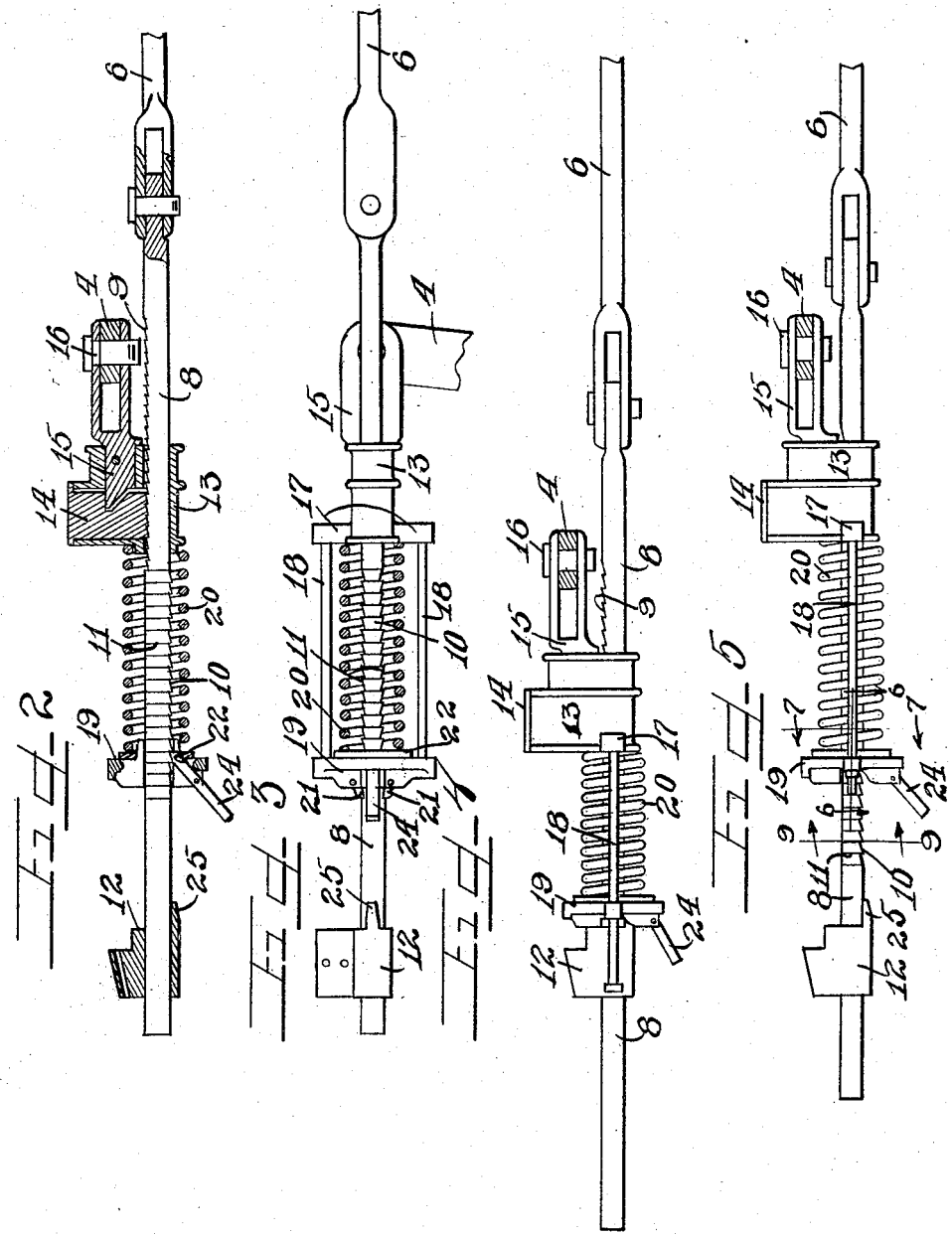

OLIVER P. WILHELM, OF MICHIGAN CITY, INDIANA.

SLACK-ADJUSTER.

1,200,286.　　　　Specification of Letters Patent.　　Patented Oct. 3, 1916.

Application filed March 10, 1915. Serial No. 13,485.

*To all whom it may concern:*

Be it known that I, OLIVER P. WILHELM, a citizen of the United States, and a resident of Michigan City, county of Laporte, and State of Indiana, have invented certain new and useful Improvements in Slack-Adjusters; and I do hereby declare that the following is a full, clear, and exact description of the same, reference being had to the accompanying drawings, and to the numerals of reference marked thereon, which form a part of this specification.

Difficulty is constantly experienced in the care and operation of brakes and brake gears on railway cars, owing to the complications introduced due to wearing down of the brake shoes upon the car wheels. It is essential in proper braking of a wheel that the wheel is not locked from movement, but that the brake shoe be applied thereto with sufficient force as to result in an impending, but not absolute, stoppage of the wheel. It is extremely difficult to constantly adjust the parts of an ordinary brake gear to compensate for the wear upon the brake shoes, and as a consequence improper braking often results.

This invention relates to a mechanism adapted to be connected into a brake gear on a railway car to vary the length of certain portions of the brake gear mechanism to compensate for the wear upon the shoes, so that the same travel of the piston in the brake cylinder always takes place to cause movement of the gear and insure proper application of the shoes on the wheel.

It is an object therefore of this invention to construct a slack adjusting mechanism for connection to a brake gear to vary the length of certain of the connecting links of the gear, so that the various sets of brake shoes may always be applied with the proper pressure to the car wheel irrespective of wear that has taken place upon the brake shoe.

It is also an object of this invention to construct a mechanism for association with the top rod and cylinder lever rod of a brake gear to change the length of the connecting means thereof to the cylinder lever to compensate for wear upon the brake shoes.

It is also an important object of this invention to construct an automatically acting mechanism operating under normal movement of the brake gear to vary the length of connections between the actuating rods and the cylinder lever of the gear to compensate for wear upon the brake shoes.

It is furthermore an important object of this invention to provide automatically acting slack adjusting means for attachment to the actuating rods for the brakes on the trucks at each end of the car to compensate for wear upon the brake shoes of the respective trucks independently of one another.

It is finally an object of this invention to construct an improved form of slack adjusting mechanism particularly adapted for connection between the actuating rods of a brake gear and the cylinder lever thereof to compensate for wear upon the brake shoes of the different trucks of a car independently of one another.

The invention (in a preferred form) is illustrated in the drawings and hereinafter more fully described.

In the drawings: Figure 1 is a bottom plan view illustrating fragmentarily the underframing of a car with a portion of the brake gear equipped with devices embodying the principles of my invention connected thereto. Fig. 2 is a fragmentary section taken on line 2—2 of Fig. 1, with parts shown in elevation. Fig. 3 is a bottom plan view of the mechanism illustrated in Fig. 2. Fig. 4 is a side view thereof, with parts in section, illustrating the mechanism in an adjusting position. Fig. 5 is a side view with parts in section, illustrating the parts returned to normal after an adjustment thereof from the relative positions shown in Fig. 2. Fig. 6 is a fragmentary detail section with parts shown in elevation taken on line 6—6 of Fig. 5. Fig. 7 is a detail section taken on line 7—7 of Fig. 5. Fig. 8 is a detail view partly in section illustrating the release of one of the jaws preliminary to an adjusting movement of the device. Fig. 9 is a fragmentary section taken on line 9—9 of Fig. 5.

As shown in the drawings: The reference numeral 1, indicates as a whole the underframing of a car on which is mounted a brake cylinder 2. The brake cylinder is provided with a piston rod 3, which at its end is connected to a cylinder lever 4, and connected on the end thereof near the point of connection of said piston rod 3, is a hand brake rod 5. Also connected to said cylinder lever 4, through adjuster mechanisms hereinafter described, are the top rod 6, and cylinder lever rod 7, respectively.

The compensating mechanisms connected to the respective rods 6 and 7, are exactly similar in construction, and each consists of a relatively long bar 8, provided with ratchet teeth 9, on the upper surface near one end thereof, and near the other end with oppositely directed ratchet teeth 10, on the under surface thereof, with ratchet teeth 11, formed on the side of said bar adjacent the teeth 10. It is apparent by reference to Figs. 6 and 8, that the ratchet teeth 11, are directed oppositely to the ratchet teeth 10, for a purpose hereinafter pointed out. One end of said bar 8 in one instance is connected to the end of the brake rod 6, and in the other instance to the end of the brake rod 7, and at its other end said rod is slidably mounted in a fixed block 12, which is secured to the underframing of the car at a convenient point.

Slidably mounted upon the bar 8, engaging around the portion provided with the ratchet teeth 9, is a cored out block 13, in which is movably mounted a block 14, provided on its under surface with teeth similar to and adapted to engage with the ratchet teeth 9, said block 14 recessed to loosely engage over the tapered end of a yoke bar 15, which engages through said block 13, and is held secured therein. Said yoke bar affords a means of connection to the cylinder lever 4, being pivotally connected thereto by means of a pintle bolt 16. Projecting laterally from the block 13, on each side thereof, are arms 17, in which are rigidly secured guide rods 18, parallel to and on each side of the ratchet bar 8. Also movably mounted upon the ratchet bar 8, is a traveling block 19, through lateral extensions of which said guide rods 18, slidably extend, the heads on the ends of said guide rods 18, however, limiting the separation between the respective blocks 13 and 19. Disposed between said respective blocks 13 and 19, is a strong spiral compression spring 20, which normally impels said blocks apart, such movement, however, being limited by the guide rods 18.

The traveling block 19, is provided with two sets of dogs or pawls for engagement with the respective ratchet teeth 10 and 11, on the ratchet bar 8. For this purpose, as clearly shown in Figs. 6 and 8, pawls 21, are pivoted horizontally in the traveling block 19, to engage the teeth 11, on the sides of the bar 8, and a plate 22, against which said spiral spring 20, bears at one of its ends, contacts the tail portions of said pawls or dogs 21, acting normally to impel the toothed ends thereof into engagement with the teeth 11. Said plate 22, is slotted to permit the tail portions of the dogs 21, to engage therein when for any reason said pawls are moved out of engagement with the teeth 11. The pawl or dog for engagement of the ratchet teeth 10, consists of a relatively long pawl 24 pivoted to swing vertically in the lower portion of the traveling block 19, as clearly shown in Fig. 8, and the toothed end thereof may be moved out of engagement with said teeth 10, when the traveling block is moved into juxtaposition with the stationary block 12, said latter block 12, being provided with a toothed or tapered extension 25, which engages the toothed end of the pawl 24, to disengage the same from the teeth 10.

The operation is as follows: Inasmuch as the respective brake rods 6 and 7, are pull rods, it is obvious that to take up or compensate for wear upon the brake shoes the links connecting said rods to the cylinder lever 4, must be shortened. Consequently, in applying the brakes, the piston rod 3, moving outwardly from the cylinder 2, swings the cylinder lever 4, and if the shoes are worn, the respective ratchet bars 8, slide through the stationary blocks 12, until said blocks 19, strike the stationary blocks 12. The tapered extensions 25, on said blocks, then disengage the dogs 24, permitting the sliding movement of the ratchet bars 8, to continue, meanwhile the springs 20, being compressed, the parts assuming the position shown in Fig. 4. When the brakes are to be released, of course the cylinder lever 4, is swung in an opposite direction, due to the retraction of the piston rod 3, and the movable blocks 13, are caused to slide over the ratchet bars 8, the toothed blocks 14, forming a part thereof, of course tracking reversely over the teeth 9, on the bars. At this time retractive movement of the ratchet bar 8, is prevented by the dogs 21, in engagement with the side teeth 11, and not until the block 13, has been retracted an amount sufficient to bring the heads of the guide rods 18, into engagement again with the traveling block 19, does said ratchet bar 8, move, and then, due to the interlocking of the pawl 24, with the teeth 10, thereon. It is obvious, therefore, by comparison of the Figs. 2 and 3, with Fig. 5, that the adjusting movement shown taking place in Fig. 4, has shifted the pivotal connection of the brake rod with the ratchet bar closer to the pivotal connection of the yoke bar 15, with the cylinder lever 4, so that the linkage between the brake rod and the cylinder lever is thus shortened.

I am aware that various details of construction may be varied through a wide range without departing from the principles of this invention, and I therefore do not purpose limiting the patent granted otherwise than necessitated by the prior art.

I claim as my invention:

1. In an adjusting device of the class described the combination with a ratchet bar, of traveling blocks mounted thereon, means associated therewith for engagement with ratchet teeth formed on said bar, resilient means disposed between said blocks to resist movement thereof toward one another, and means connected with said blocks for limiting movement of said blocks away from one another.

2. In a device of the class described the combination with the cylinder lever and brake rod of a brake gear, of a take-up mechanism comprising a ratchet bar, traveling blocks thereon, yieldable connections between said traveling blocks, means limiting the separation of said blocks on said ratchet bar, and dogs associated with said blocks to cause movement of said mechanism as a unit to transmit the movement between said lever and rod.

3. In an automatic adjusting mechanism for brake gears a ratchet bar, traveling blocks thereon, a yieldable connection therebetween, dogs mounted on said blocks to engage said ratchet bar and insure movement of said mechanism as a rigid unit, and means releasing said dogs to permit adjustment of said blocks upon said ratchet bar for adjustment of the brake gear.

4. In a device of the class described a ratchet bar, traveling blocks thereon adapted to receive said bar slidably mounted therethrough, teeth formed on said ratchet bar, a yieldable connection between said traveling blocks, and ratchet mechanism associated with said blocks for interlocking with said bar to automatically take up slack in a brake gear.

5. In a device of the class described a ratchet bar, ratchet mechanisms mounted thereon adapted to interlock therewith, yieldable connections between said ratchet mechanisms, and guide rods connected with said mechanisms limiting the movement of said ratchet mechanisms from one another.

6. In a take-up mechanism for brake gears adjustably connected traveling blocks, a spring interposed therebetween, and a bar having a plurality of sets of ratchet teeth thereon passing through said blocks permitting said blocks to assume different positions of adjustment upon the bar.

7. In a device of the class described automatic slack adjusting mechanisms embracing a toothed bar, traveling blocks thereon adapted to interlock therewith at different positions thereon, and stationary means adapted to receive said bar and disengage said blocks from locking position.

8. In a device of the class described a toothed bar, traveling blocks movably mounted thereon, pawls mounted in said blocks adapted to engage with said bar to lock said blocks in different positions on said bar, and springs interposed between said blocks to normally impel the same to a predetermined distance from one another on said bar.

9. In a slack adjusting mechanism for brake gears a toothed bar connected to a brake rod, a traveling block thereon connected to the cylinder lever for said brake rod, and means automatically shifting said block upon said bar to take up for overtravel of the gear due to wearing down of the brake shoes.

10. In a device of the class described a toothed bar connected to a brake rod, a traveling block on said bar connected to a cylinder lever for actuating said brake rod, another traveling block mounted upon said bar, pawls mounted in each of said blocks to interlock the same with said toothed bar, and means slidably engaged by said bar for automatically releasing said pawls to shift the relative position of said blocks upon said bar to take up for overtravel in the brake gear.

11. In a device of the class described a bar, a plurality of sets of teeth thereon, traveling blocks mounted on said bar, dogs pivoted in said blocks adapted to engage the teeth on said bar to interlock said blocks with said bar, means limiting the movement of said blocks away from one another, and a spring coiled around said toothed bar and resisting movement of said traveling blocks toward one another.

In testimony whereof I have hereunto subscribed my name in the presence of two subscribing witnesses.

OLIVER P. WILHELM.

Witnesses:
CHARLES W. HILLS, Jr.,
FRANK K. HUDSON.

Copies of this patent may be obtained for five cents each, by addressing the "Commissioner of Patents, Washington, D. C."